United States Patent [19]

Buiani

[11] Patent Number: 5,601,339
[45] Date of Patent: Feb. 11, 1997

[54] SYSTEM FOR THE ASSEMBLY AND CLAMPING OF SEATS WHICH CAN BE DISMANTLED

[75] Inventor: Gianfranco Buiani, S. Giovanni Al Natisone, Italy

[73] Assignee: Buiani Lino & Figli Srl, Italy

[21] Appl. No.: 539,961

[22] Filed: Oct. 6, 1995

[30] Foreign Application Priority Data

Nov. 18, 1994 [IT] Italy ................. UD94A0187

[51] Int. Cl.$^6$ ................................. A47C 7/00
[52] U.S. Cl. ................. 297/440.1; 403/43; 403/44; 403/48; 411/389
[58] Field of Search ................. 297/440.1; 403/43, 403/44, 45, 47, 48; 411/388, 389

[56] References Cited

U.S. PATENT DOCUMENTS

| 145,116 | 12/1873 | McKiernan | 403/44 |
|---|---|---|---|
| 345,290 | 7/1886 | Evans | 403/48 |
| 369,392 | 9/1887 | Bungarz | 411/389 |
| 407,559 | 7/1889 | Wells | 403/44 |
| 946,594 | 1/1910 | Brock | 403/43 |
| 1,876,720 | 9/1932 | Merrill | 403/43 X |
| 2,087,376 | 7/1937 | Filiberto . | |
| 2,403,828 | 7/1946 | Rawlings | 403/43 |
| 2,839,809 | 6/1958 | Warner et al. | 411/389 X |
| 3,119,472 | 1/1964 | McLeod | 411/389 X |
| 3,295,873 | 1/1967 | Attwood | 411/389 X |
| 3,837,753 | 9/1974 | Weiste et al. | 403/44 X |
| 4,081,219 | 3/1978 | Dykmans | 403/43 |
| 4,408,925 | 10/1983 | Louie | 403/43 X |
| 4,563,040 | 1/1986 | Alster | 297/440.1 |
| 4,729,707 | 3/1988 | Takahashi | 403/45 X |
| 4,786,201 | 11/1988 | Huetter et al. | 411/389 X |
| 4,931,008 | 6/1990 | Morrison | 403/45 X |
| 5,156,482 | 10/1992 | Owings | 403/43 |

FOREIGN PATENT DOCUMENTS 1508585   4/1978   United Kingdom ................ 297/440.2

*Primary Examiner*—Peter M. Cuomo
*Assistant Examiner*—Rodney B. White
*Attorney, Agent, or Firm*—Breiner & Breiner

[57] ABSTRACT

System for the assembly and clamping of seats which can be dismantled, these seats, stools or chairs (11) or the like comprising a front element (12a) and a rear element (12b) connected to each other by lateral cross-members (15, 16) including terminal tenons (17) cooperating with containing mortises (18) made in the front (12a) and rear (12b) elements or other reciprocal connection means of a known type such as pins, hollows and like elements, the seams (11) being also able to consist of two opposed lateral elements connected together by front and rear cross-members, the system being characterised in that it comprises at least one tensioner means (20) the ends of which cooperate with anchorage means (19) included in coordinated positions in the respective opposed faces of the front (12a) and rear (12b) elements or of the lateral elements.

14 Claims, 4 Drawing Sheets

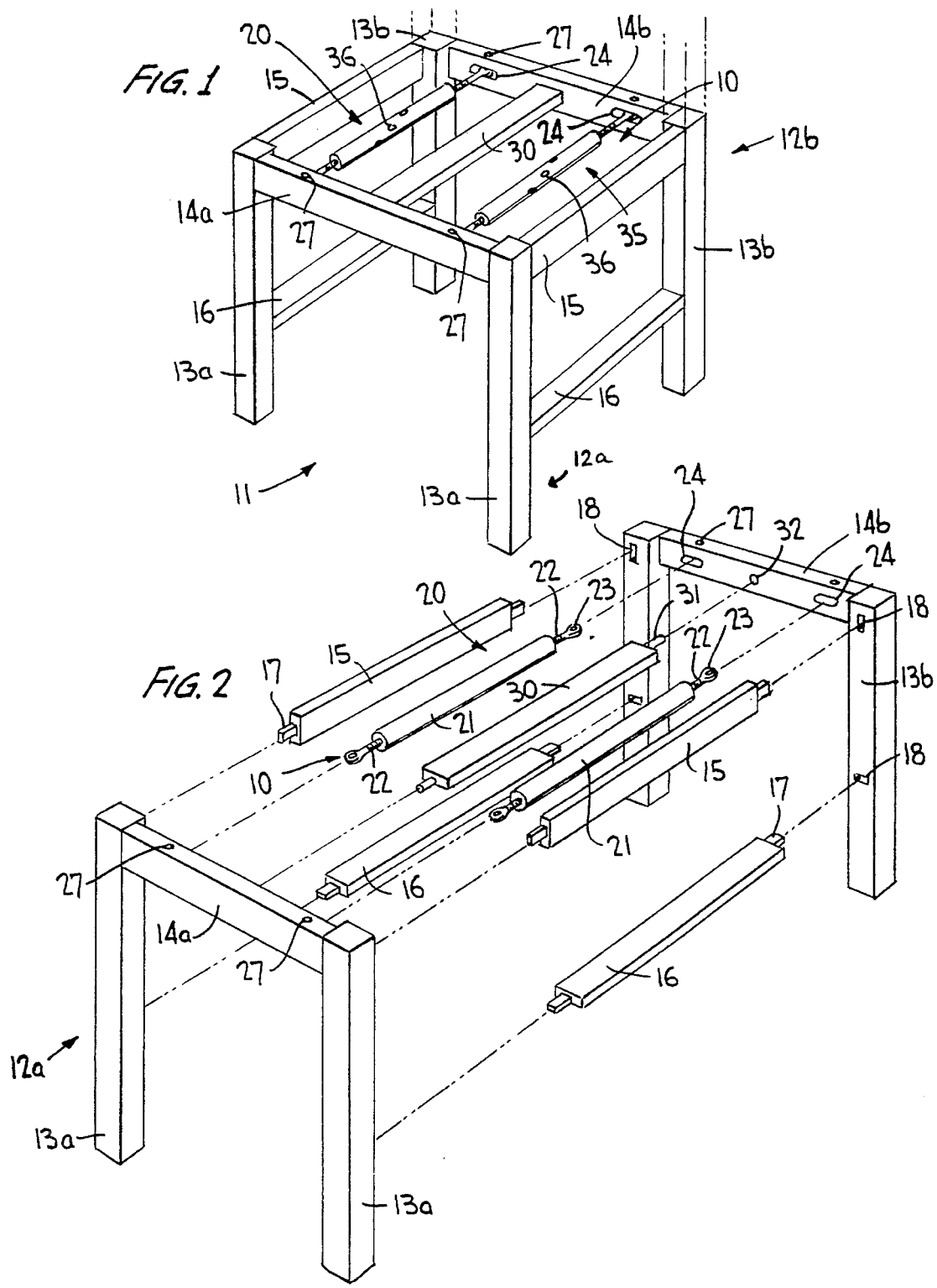

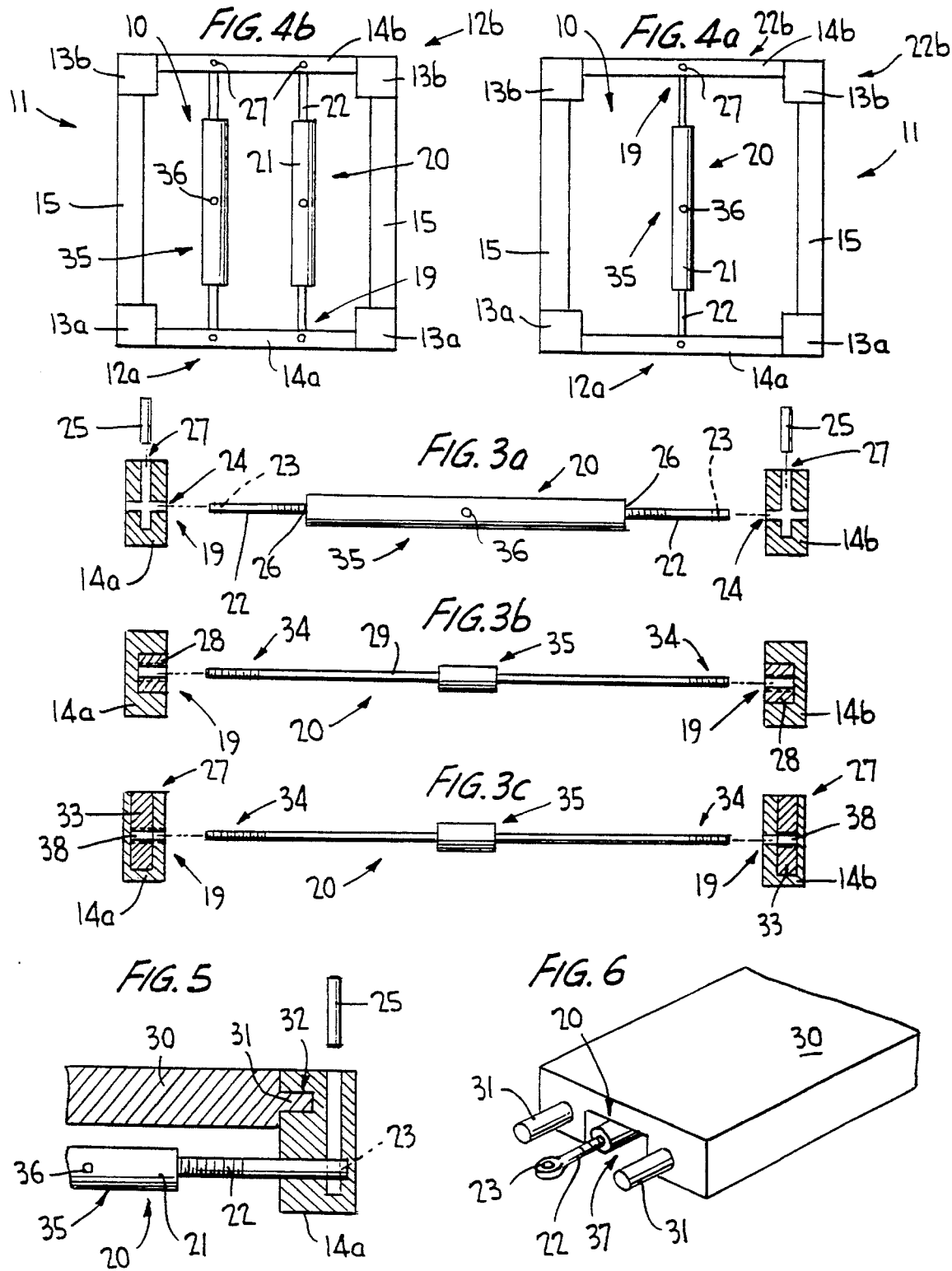

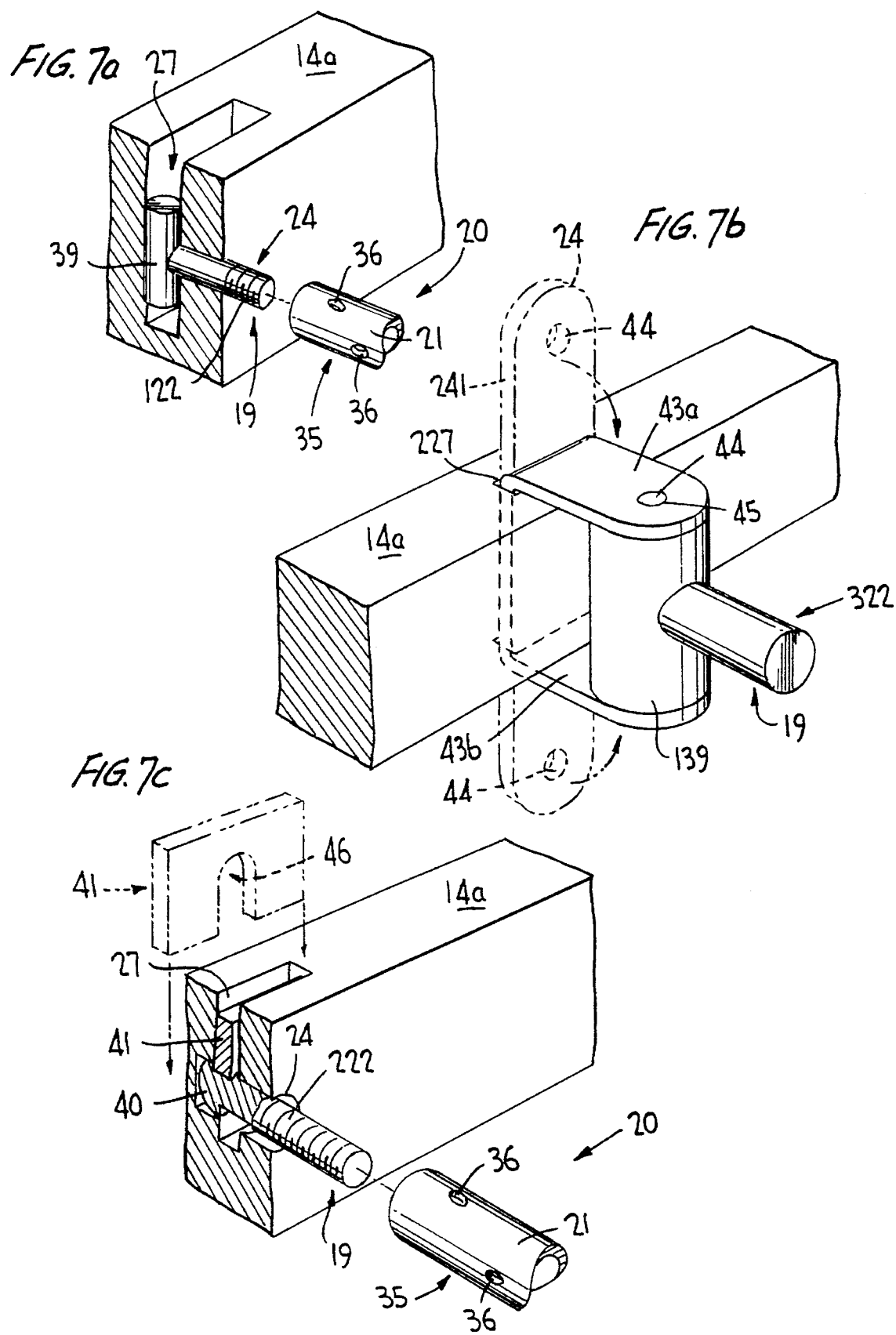

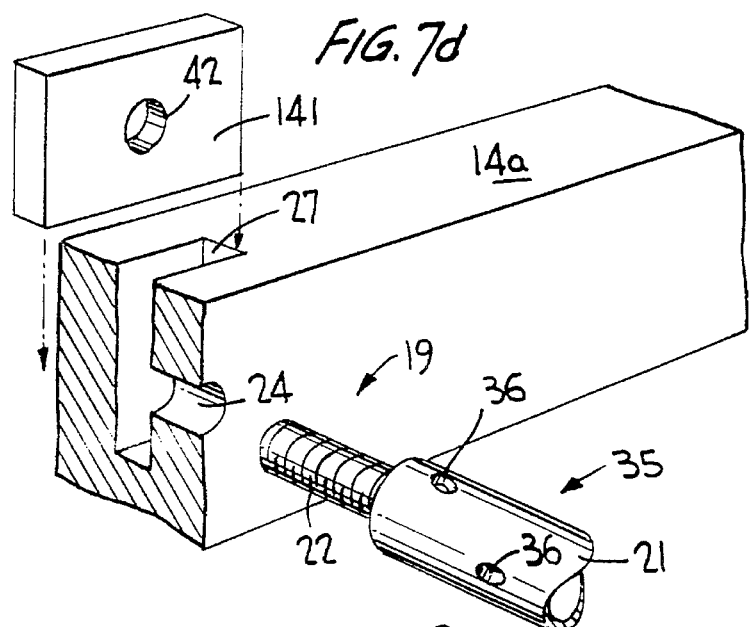
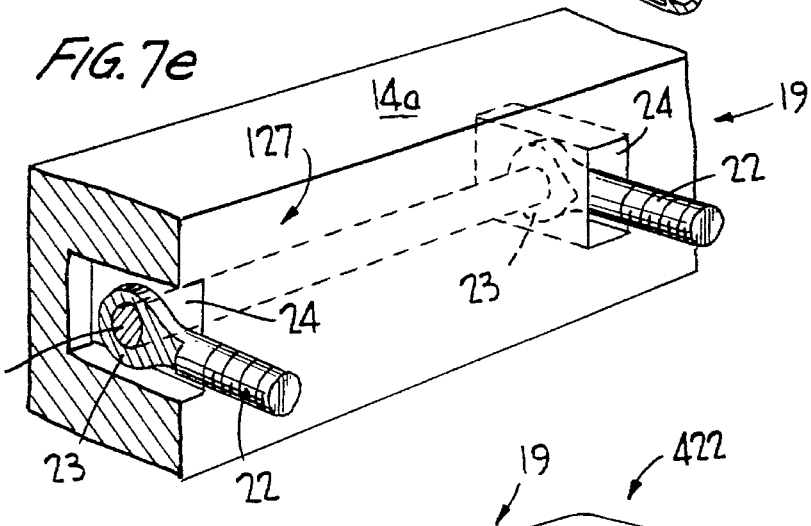
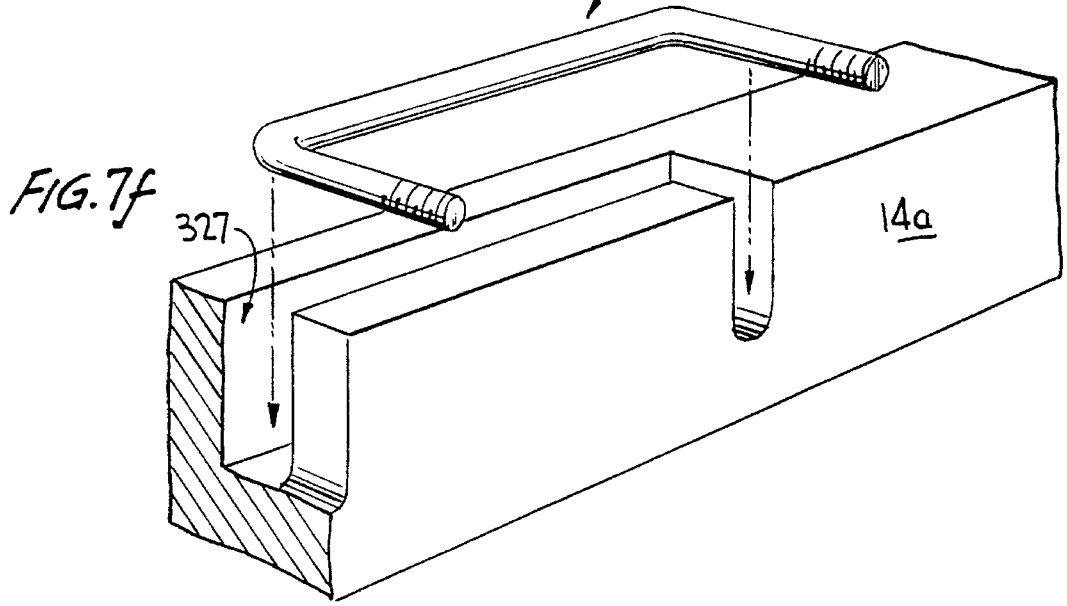

SYSTEM FOR THE ASSEMBLY AND CLAMPING OF SEATS WHICH CAN BE DISMANTLED

This invention concerns a system for the assembly and clamping of seats which can be dismantled, as set forth in the main claim.

The system according to the invention is applied to the field of seats, stools, chairs and the like for the production of seats, stools, chairs and the like which can be dismantled and which can be readily and quickly assembled and dismantled by the user.

The seats, stools, chairs and the like to which the invention is applied can be made of wood, metal, a plastic or any other like material.

The state of the art includes seats, stools, chairs and the like which are made of wood, metal, a plastic or another material and which are sold in the dismantled state and are assembled by the user.

For simplicity of disclosure we shall refer in the following description to stools which can be dismantled, but the invention is applied equally well also to seats, chairs and the like.

These stools which can be dismantled make possible a considerable reduction in the costs of packing, storage and transport since the volume taken up by the stools in their dismantled state is much smaller and more limited than that taken up by the stool in its assembled state.

Moreover, the cost of the packing material is greatly reduced owing to the modest dimensions of the stool in its dismantled state.

Some known models of stools which can be dismantled are assembled and their elements are kept clamped by coupling with constraining contact.

To be more exact, the legs or uprights of the stools contain mortises with which the tenons of a mating shape of the cross-members forming the stool cooperate.

According to other systems the cooperation and reciprocal clamping of the uprights to the cross-members are provided by auxiliary elements such as pins, screws or other like elements.

An adhesive may be used to prevent relative movements as between the uprights and the cross-members but, as time goes by, the adhesive may not ensure a secure clamping of the uprights to the cross-members, and problems may arise owing to the relative displacements of the elements, thus making the stool unstable and insecure.

Furthermore, the use of an adhesive no longer permits the dismantling of the stool when the latter has been assembled.

Besides, the use of an adhesive may lead to staining of the cross-members or legs, thus spoiling the aesthetic appearance.

So as to prevent these shortcomings, stools have been proposed which can be dismantled and in which the cross-members contain lodgements for screws which cooperate with the uprights; these screws move substantially on the same axis as the cross members and require the employment of special equipment to perform their tightening and slackening.

Moreover, the arrangement of these screws in the cross-members requires the screws to have special shapes and to be of small dimensions so as not to exert traction of a great value between the adjacent cross-members.

With this last system the work of assembling and dismantling the stool becomes complicated and burdensome and for this reason these stools have not met the requirements of users.

The present applicants have designed, tested and embodied this invention to overcome the shortcomings of the state of the art and to achieve further advantages.

This invention is set forth and characterised in the main claim, while the dependent claims describe variants of the idea of the main embodiment.

The purpose of this invention is to provide a system for the assembly of seats, stools, chairs or the like which can be dismantled, the system making possible the assembly and dismantling of the seats or stools in a quick and safe manner without the need of special equipment.

The assembly system according to the invention is practical, economical and not subject to breakage or failure.

The system according to the invention is applied to seats or stools consisting of a front element and a rear element associated with each other by at least one lateral cross-member located on each side.

The system is also applied to seats or stools consisting of a right hand element and a left hand element which are substantially counterparts of each other and are associated with each other by at least one front cross-member and one rear cross-member.

For the sake of simplicity of the description we shall refer in the following description to the first of the above two types of seat even if the teaching of this invention is applied also to the second type of seat with appropriate replacement of the terms used.

The system according to the invention comprises at least one tensioner means, which can be axially adjusted continuously and of which the ends are removably associated respectively with the cross-member of the front element and the cross member of the rear element.

Where the seats consist of a righthand element and a lefthand element, the tensioner means is positioned with its ends associated respectively with the righthand element and the lefthand element.

The tensioner means, where there is only one, is positioned at a right angle to, and at a median position in relation to, the cross-members.

According to a variant the assembly and clamping system according to the invention comprises at least two tensioner means, which are positioned substantially parallel to each other and symmetrically in relation to the lateral cross-members.

According to a further variant the assembly and clamping system according to the invention includes at least one stiffening spacer element of a fixed determined length, which cooperates with the respective cross-members of the front and rear elements.

This at least one spacer element has the task of preventing bending of the cross-members of the front and rear elements when the tensioner means is actuated.

Where there are two tensioner means, the spacer element is located advantageously at an intermediate position symmetrical in relation to the two tensioner means so as to distribute the stresses acting on the cross-members of the front and rear elements in a symmetrical manner.

According to a variant the tensioner means is positioned below or above the spacer element.

According to another variant the tensioner means is associated with the spacer element.

The spacer element may act also as an element to support the seating surface.

The attached figures are given as a non-restrictive example and show some preferred embodiments of the invention as follows:

FIG. 1 is a three-dimensional view of a stool including the assembly and clamping system according to the invention;

FIG. 2 is a three-dimensional knocked-down view of the stool of FIG. 1;

FIGS. 3a to 3c show in an enlarged scale three possible embodiments of the tensioner means employed in the assembly system according to the invention;

FIGS. 4a and 4b are plan view diagrams of two variants of the assembly and clamping system of FIG. 1;

FIG. 5 is a partial cross-section of a variant of the system of FIG. 2;

FIG. 6 is a three-dimensional diagram of a variant of FIG. 5;

FIGS. 7a to 7f show three-dimensional partly cutaway views of variants of the assembly and clamping system.

The reference number 10 in the attached figures denotes generally a system according to the invention for the assembly and clamping of stools 11 which can be dismantled; the invention is applied equally well to seats, stools, chairs or the like.

In this case, the stool 11 which can be dismantled comprises a front element 12a, which in this case is shaped as an overturned "U" and consists of two legs 13a connected by a front cross-member 14a, and a rear element 12b, which in this case is shaped as an overturned "U" and consists of two legs 13b connected by a rear cross-member 14b.

According to a variant each of the two elements 12 is embodied with one single body.

The front 12a and rear 12b elements are assembled together with two upper lateral cross-members 15 and with two lower lateral cross-members 16, each cross-member 15, 16 containing at its ends tenons 17 which cooperate with mortises 18 of a mating shape provided at coordinated positions in the legs 13a, 13b.

The respective front 14a and rear 14b cross-members include on their opposed faces anchorage means 19, with which are associated the ends of a tensioner means 20, which can be adjusted axially in a continuous manner during the operations of assembly of the stool 11.

The anchorage means 19 are fitted advantageously within hollows 24 provided in the front 14a and rear 14b cross-members.

In the case of the stool 11 shown in FIGS. 1 and 2 the tensioner means 20 comprises a screw shackle 21 containing female threaded portions at its ends and cooperating with two screws 22, each of which includes a terminal eyelet 23.

The female threaded portions 26 have respectively a righthand thread and a lefthand thread so that, by rotating the screw shackle 21, the screws 22 move axially in opposite directions so as to shorten or lengthen the tensioner means 20.

The screw shackle 21 includes peripheral engagement means 35 consisting in this case of through holes 36 so as to enable the screw shackle 21 to be rotated.

According to this form of embodiment the eyelets 23 cooperate with pins 25, which are inserted into holes 27 perpendicular to and communicating with the hollows 24 containing the eyelets 23.

These holes 27 may be either of a blind type with an upper or lower aperture or of a through type, depending on the type of pin 25 used.

The pin 25 has the twofold task of securing the ends of the tensioner means 20 firmly to the front 14a and rear 14b cross-members and of distributing the tensile stresses applied by the tensioner means 20 over the whole height of the cross-members 14.

According to a special form of embodiment shown in FIG. 7e the front and rear cross-members 14 include two hollows 24 cooperating with a substantially horizontal hole 127, through which is introduced a pin 125 that cooperates with the eyelets 23 of the screws 22, each of which is associated with a screw shackle 21.

According to a variant shown in FIG. 7a the anchorage means 19 of the tensioner means 20 consist of T-shaped screws 122 having a cross-piece 39 at one end. In this case each screw 122 is inserted into a corresponding hollow 24 made in the front and rear cross-members 14 until it cooperates with the hole 27 and is then rotated by 90° to prevent it being axially withdrawn.

According to a variant shown in FIG. 7b the anchorage means 19 comprise a flat clamping plate 241, which cooperates with a vertical through hole 227 made in the front and rear cross-members 14.

This flat clamping plate 241 contains in the vicinity of each of its ends a hole 44 and is fitted so as to protrude beyond the sides of the front and rear cross-members 14.

This flat clamping plate 241, when it has been inserted into the hole 227, is bent to a U-shape so as to provide two fins, an upper fin 43a and lower fin 43b respectively, for the positioning and clamping of the cross-piece 139 of the T-shaped screw 322.

In this case, the cross-piece 139 includes on both its ends a pin 45, which cooperates with the holes 44.

According to a variant shown in FIG. 7c the anchorage means 19 comprise a screw 222 having a terminal head 40, which has an enlarged diameter and cooperates with an aperture 46 provided in a clamping plate 41, which is positioned in the hole 27 after the screw 222 has been fully inserted into the hollow 24.

This aperture 46 has a width substantially equal to, or greater than the diameter of the screw 222 but smaller than the diameter of the head 40 of the screw 222.

According to a further variant shown in FIG. 7d the anchorage means 19 comprise a screw 22 cooperating with a threaded hole 42 provided in a coordinated position in the clamping plate 141 contained in the hole 27.

According to a further variant shown in FIG. 7f and used to cooperate simultaneously with two screw shackles 21, the anchorage means 19 comprise a U-shaped screw 422 with both its ends threaded.

The front and rear cross-members 14 include a groove 327 having a shape mating with the screw 422 and open at its upper side; the U-shaped screw 422 is inserted into the groove 327.

According to a variant shown in FIG. 3b the tensioner means 20 consist of a tension rod 29 having its ends 34 threaded in opposite directions, and the anchorage means 19 consist of sleeves 28, which are firmly associated with the front 14a and rear 14b cross-members and are positioned in the opposed faces of those cross-members 14.

According to another variant shown in FIG. 3c the anchorage means 19 consist of prismatic or cylindrical elements 33 inserted in holes 27 of a mating shape; these prismatic or cylindrical elements 33 contain at an intermediate position a threaded through hole 38 perpendicular to their axes, with which through hole 38 the threaded ends 34 of the tension rod 29 cooperate.

According to a variant shown in FIG. 4a the assembly and clamping system 10 according to the invention comprises only one tensioner means 20 positioned perpendicular to the front 14a and rear 14b cross-members and at a position substantially in the middle between the lateral cross-members 15.

According to another variant shown in FIG. 4b the assembly and clamping system 10 according to the invention comprises two tensioner means 20 fitted substantially parallel beside each other and perpendicular to the front 14a and rear 14b cross-members.

According to yet another variant, which is not shown here, the assembly and clamping system 10 according to the invention comprises two parallel tensioner means 20 superimposed on each other.

According to the forms of embodiment shown in FIGS. 1 and 2, the assembly and clamping system 10 according to the invention comprises at least one spacer element 30 of a fixed and determined length, the ends of which cooperate with the opposed faces of the front 14a and rear 14b cross-members.

In the case of FIGS. 1 and 2, the spacer element 30 includes terminal tenons 31, which cooperate with mortises 32 machined in coordinated positions in the opposed faces of the front 14a and rear 14b cross-members.

The spacer element 30 has the purpose of preventing the bending of the front 14a and rear 14b cross-members, this bending being generated by the tensioner means 20 when the latter are put under tension.

The spacer element 30 has also the task of distributing equally the tensions generated in the front and rear cross-members 14a, 14b by the tensioner means 20.

Moreover, the spacer element 30 can also act as an element for the supporting and fixture of the seating surface associated with the stool 11.

According to the variant shown in FIG. 5, the tensioner means 20 is fitted on the same axis as, and below, the spacer element 30.

According to a variant the tensioner means 20 is fitted on the same axis as, and above, the spacer element 30.

According to a further variant shown in FIG. 6 the spacer element 30 contains a longitudinal hollow 37 into which the tensioner means 20 according to the invention is inserted.

I claim:

1. Assembly and clamping system for seating apparatus comprising a first side element and a second side element structurally connected by a mateable connecting means to each other by at least two lateral cross-members, and extending between said first side element and said second side element at least one tensioner means having a first end and a second end which cooperatively engage an anchorage means situated in an inward facing sidewall of each said first side element and said second side element respectively, wherein each of said anchorage means includes an opening which extends only partially into each of said first side element and said second side element or each of said anchorage means is fixedly attached to each of said inward facing sidewall of said first side element and said second side element.

2. Apparatus and clamping system according to claim 1 wherein said tensioner means comprises a tension rod having a right-handed threaded portion on said first end and a left-handed threaded portion on said second end.

3. Assembly and clamping system according to claim 2 wherein said tension rod cooperates with threaded sleeves present in each of said opening in said first side element and said second side element.

4. Assembly and clamping system according to claim 2 wherein said tension rod cooperates with a prismatic or cylindrical screw thread element present in each of said opening in said first side element and said second side element.

5. Assembly and clamping system according to claim 1 wherein said tensioner means comprises a screw shackle containing a right-handed threaded portion on said first end and a left-handed threaded portion on said second end, said screw shackle cooperating at each of said first end and said second end with said anchorage means.

6. Assembly and clamping system according to claim 5 wherein each end of said right-handed threaded portion and said left-handed threaded portion each includes an eyelet which cooperates with a pin present in relation to each of said anchorage means.

7. Assembly and clamping system according to claim 6 wherein each of said anchorage means includes said opening which comprises a vertically extending opening in conjunction with a horizontally extending opening, and wherein each pin is lodged in the horizontally extending opening.

8. Assembly and clamping system according to claim 2 or claim 5 wherein each of said anchorage means includes said opening and said opening is threaded and has a clamping plate present in relation thereto for holding an end of said tensioner means in said opening.

9. Assembly and clamping system according to claim 1 wherein each of said anchorage means comprises a T-shaped screw means clamped in an axially displaceable manner in a vertical hole.

10. Assembly and clamping system according to claim 1 wherein each of said anchorage means includes said opening and further comprises a screw means having a head of enlarged diameter retained axially in an aperture present in a clamping plate lodged in said opening.

11. Assembly and clamping system according to claim 1 wherein each of said anchorage means includes said opening and further comprises a screw means with a cross-piece head freely rotatably associated with a U-shaped clamping plate lodged in said opening.

12. Assembly and clamping system according to claim 1 wherein each of said anchorage means includes said opening wherein said opening is U-shaped providing two apertures in said inward facing sidewall and each of said anchorage means further comprises a U-shaped screw means having a first threaded free end and a second threaded free end which each extend through one of the two apertures of said opening to cooperate with said tensioner means.

13. Assembly and clamping system according to claim 1 further comprising at least one spacer element extending between each of said inward facing sidewall of said first side element and said second side element.

14. Assembly and clamping system according to claim 13 wherein said at least one spacer element at least partially covers said tensioner means.

\* \* \* \* \*